United States Patent
Sharma

(10) Patent No.: US 7,248,587 B1
(45) Date of Patent: Jul. 24, 2007

(54) ERROR RECOVERY OF VARIABLE-LENGTH PACKETS WITHOUT SEQUENCE NUMBERS OR SPECIAL SYMBOLS USED FOR SYNCHRONIZING TRANSMIT RETRY-BUFFER POINTER

(75) Inventor: Anup Sharma, Sunnyvale, CA (US)

(73) Assignee: Azul Systems, Inc., Mountain View, CA (US)

( * ) Notice: Subject to any disclaimer, the term of this patent is extended or adjusted under 35 U.S.C. 154(b) by 295 days.

(21) Appl. No.: 10/907,662

(22) Filed: Apr. 11, 2005

(51) Int. Cl.
*H04L 12/28* (2006.01)

(52) U.S. Cl. .................. 370/394; 370/473; 370/395.1; 370/395.52; 455/418; 455/419

(58) Field of Classification Search .............. 370/394, 370/473, 340, 395.1, 395.52; 455/418, 419
See application file for complete search history.

(56) References Cited

U.S. PATENT DOCUMENTS

| | | | | |
|---|---|---|---|---|
| 4,584,685 A | | 4/1986 | Gajjar ........................ 714/751 |
| 4,726,027 A | | 2/1988 | Nakamura et al. .......... 714/748 |
| 5,265,103 A | * | 11/1993 | Brightwell .................. 714/748 |
| 5,715,257 A | | 2/1998 | Matsuki et al. ............. 714/748 |
| 5,896,402 A | | 4/1999 | Kurobe et al. .............. 714/748 |
| 6,377,541 B1 | * | 4/2002 | Boetzel ....................... 714/748 |
| 6,741,554 B2 | | 5/2004 | D'Amico et al. ........... 370/225 |
| 2002/0080723 A1 | | 6/2002 | Hoch et al. ................. 370/248 |
| 2002/0166007 A1 | * | 11/2002 | Goudie ........................ 710/52 |
| 2003/0066016 A1 | | 4/2003 | Wehage ...................... 714/781 |
| 2003/0103459 A1 | * | 6/2003 | Connors et al. ............ 370/235 |
| 2003/0112759 A1 | | 6/2003 | Zhang et al. ............... 370/236 |
| 2004/0081163 A1 | * | 4/2004 | Lecha et al. .............. 370/395.7 |
| 2004/0090916 A1 | | 5/2004 | Hosein ....................... 370/235 |
| 2006/0126665 A1 | * | 6/2006 | Ward et al. ................. 370/474 |

\* cited by examiner

*Primary Examiner*—Matthew Anderson
*Assistant Examiner*—Minh Dao
(74) *Attorney, Agent, or Firm*—gPatent LLC; Stuart T. Auvinen

(57) ABSTRACT

Variable-length packets transmitted over a serial link do not have packet-start fields or unique symbols to mark the beginning of each packet. Instead, a length field indicates the packet's length, allowing the end of the packet to be located. Packets also do not have sequence numbers. When an error is detected, the receiver sends a control symbol over a reverse channel to signal the transmitter. The control symbol never occurs in a normal packet. Packet buffers in the transmitter and receiver have read and write pointers and also have de-allocation pointers that are synchronized between receiver and transmitter. As packets are error checked, the receiver advances its de-allocation pointer and updates the transmitter's de-allocation pointer, allowing the packets to be discarded from the transmitter's buffer only after the receiver finishes error checking. The transmitter re-transmits packets from its buffer starting from the de-allocation pointer when its receives the control symbol.

19 Claims, 10 Drawing Sheets

US 7,248,587 B1

ERROR RECOVERY OF VARIABLE-LENGTH PACKETS WITHOUT SEQUENCE NUMBERS OR SPECIAL SYMBOLS USED FOR SYNCHRONIZING TRANSMIT RETRY-BUFFER POINTER

FIELD OF THE INVENTION

This invention relates to packet-based communications, and more particularly to error recovery of variable-length packets using synchronized re-try buffers.

BACKGROUND OF THE INVENTION

Serial communications links are widely used in electronic systems. Data may be serially transmitted over a wire or a differential pair of wires between a transmitter and a receiver. The data may be arranged into packets of data to facilitate management. Packets can include a checksum such as a cyclical-redundancy-check (CRC) that allow for error detection. Packets with errors can be re-transmitted. Such error recovery allows for random bit errors and provides for more robust communications or higher speeds.

FIG. 1 shows fixed-length packets. Each packet 10 contains a fixed number of bits. The fixed packet size facilitates locating the start of each packet. A bit counter may be used to count off X bits and indicate the start of the next packet.

However, if an error occurs such as a dropped bit, all downstream data may be corrupted since the start of the following packets cannot be determined. Also, fixed-size packets are undesirable since they can be inefficient. Data from various sources may not exactly fit into the fixed packet size. For example, the packet may be larger than the data that needs to be sent from one source, and it may be undesirable to have one packet carry data from two or more sources.

FIG. 2 shows variable-size packets with framing bits to mark packet locations. A special framing symbol or packet-start field 12 may be used to mark the start of each new packet. The framing symbol is a bit sequence that is never found in data payload 16 or other fields in a packet, such as sequence numbers 14. Thus when the bit stream matches the framing symbol, packet-start field 12 is detected.

When an error occurs, the next packet may begin unexpectedly. Since packet-start field 12 is a unique sequence of bits, when this unique bit sequence is detected, reception of the next packet must begin and reception of the prior packet must end. The prior packet can later be re-transmitted by sending the packet's sequence number 14 to the transmitter in a re-transmit request.

Using packet-start field 12 provides a fairly robust communications protocol. Unfortunately, packet-start field 12 increases the protocol's overhead, since the number of data bits in data payload 16 that may be sent for a period of time is reduced by the size of packet-start fields 12 that are sent. Also, sequence numbers further reduce the available bandwidth for data payload 16. Thus bandwidth efficiency is reduced because of packet-start field 12.

A go-back-N protocol may be used. When an error is detected, the receiver requests that the prior N packets be re-transmitted, where N is a predetermined number. A sliding window buffer of the last N packets may be kept by the transmitter to be re-transmitted when a go-back-N request is received from the receiver, such as in a not-acknowledgement (NACK) packet. However, the data bandwidth is still reduced because each packet includes a special unique frame-start symbol in packet-start field 12. Various other schemes and flow-control are known.

What is desired is a packet communications protocol that uses variable-size packets but does not have packet-start field 12. A packet-based communications system that does not have special control symbol to mark the start of each packet is desirable. A packet communicator that allows for error recovery without sequence numbers or packet-start fields is desirable.

DETAILED DESCRIPTION

The present invention relates to an improvement in error-recovery of variable-size packets. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
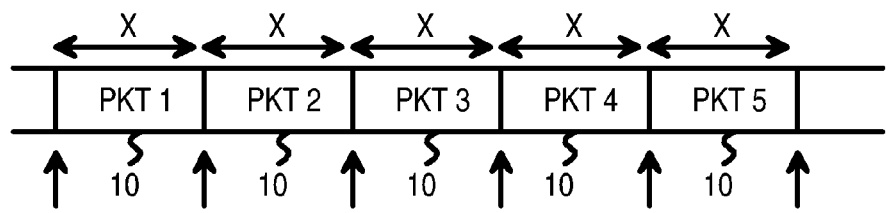
FIG. 1 shows fixed-length packets.
Figure 2:
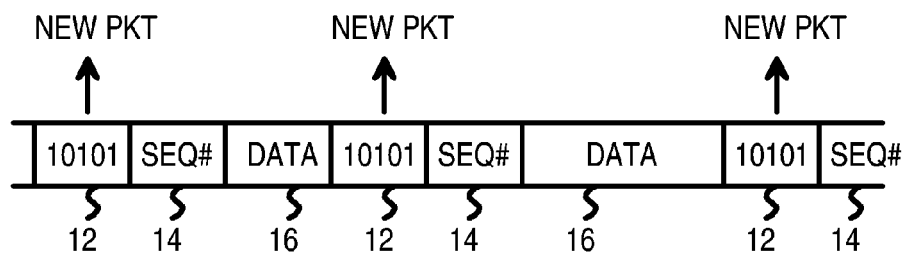
FIG. 2 shows variable-size packets with framing bits to mark packet locations.
Figure 3A:
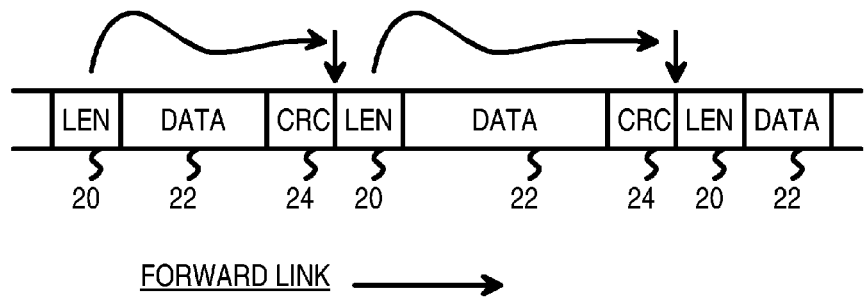
FIGS. 3A-C show packets without packet-start fields that use special symbols for signaling errors.
Figure 3B:
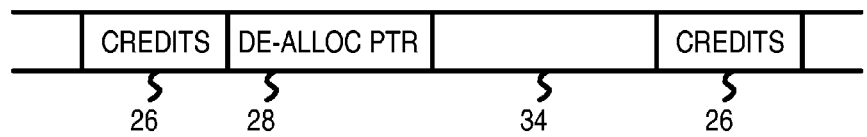
Figure 3C:
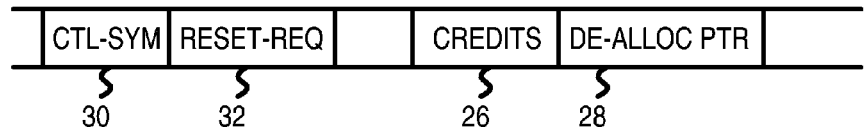

FIGS. 3A-C show packets without packet-start fields that use special symbols for signaling errors. In FIG. 3A, each variable-size packet begins with a length field 20 that indicates the length of the current packet. Data payload 22 varies in size with length field 20. The packet ends with CRC checksum 24, which can be used to detect errors in data payload 22.

Since there is no packet-start field, the bandwidth available for data payloads 22 and CRC checksums 24 is increased. Special symbols such as packet-start symbols are not used during normal packet transmission. Instead, special symbols are sent to signal when an error was detected.

In FIG. 3B, the reverse-link carries packets in the reverse direction. The forward-link transmitter of FIG. 3A becomes the receiver for the reverse link, while the forward-link receiver of FIG. 3A becomes the transmitter for the reverse link.

The reverse link can carry packets with length fields, data payloads, and CRC checksums in reverse packets during times 34. These reverse packets can be similar to the forward packets shown in FIG. 3A. In addition, the reverse link carries flow credits 26 and de-allocation pointer 28.

Flow credits 26 are for flow control as described later in FIG. 6. The transmitter must stop transmitting packets when it runs out of flow credits, while the receiver sends credits 26 back to the transmitter as packets complete processing by the receiver and buffer space becomes available. Flow credits can prevent overflow of the receiver's buffers.

The receiver advances re-try or de-allocation pointer 28 when a received packet has been error checked and properly received and sent on to the receiver's system. De-allocation pointer 28 indicates the last packet that has been safely and fully received without errors. The transmitter can discard a copy of transmitted packets once de-allocation pointer 28 is advanced past the packets.

The receiver sends credits 26 and de-allocation pointer 28 opportunistically, as bandwidth is available between packets sent over the reverse channel. A timer can also be used to force transmission of credits 26 and de-allocation pointer 28 after a period of time or number of bytes. Credits 26 and de-allocation pointer 28 can also be sent over the forward link for flow control of the reverse link, but are not shown in FIG. 3A.

In FIG. 3C, the receiver that received the forward-link data of FIG. 3A has detected an error. Control symbol 30 is sent over the reverse link to indicate that an error was detected. Reset-request 32 is also sent over the reverse link to begin error processing. The current de-allocation pointer 28 is sent over the reverse link to indicate where to begin re-transmitting packets. The transmitter then re-sends packets over the forward link.

Control symbol 30 is a unique bit sequence that does not appear in data-payload 22 or in length field 20 or in CRC checksum 24. A flow-control virtual channel can be used to pass control symbol 30 and credits back to the transmitter on the reverse link. Special packets can be defined for control symbol 30 and for credits.

Figure 4:
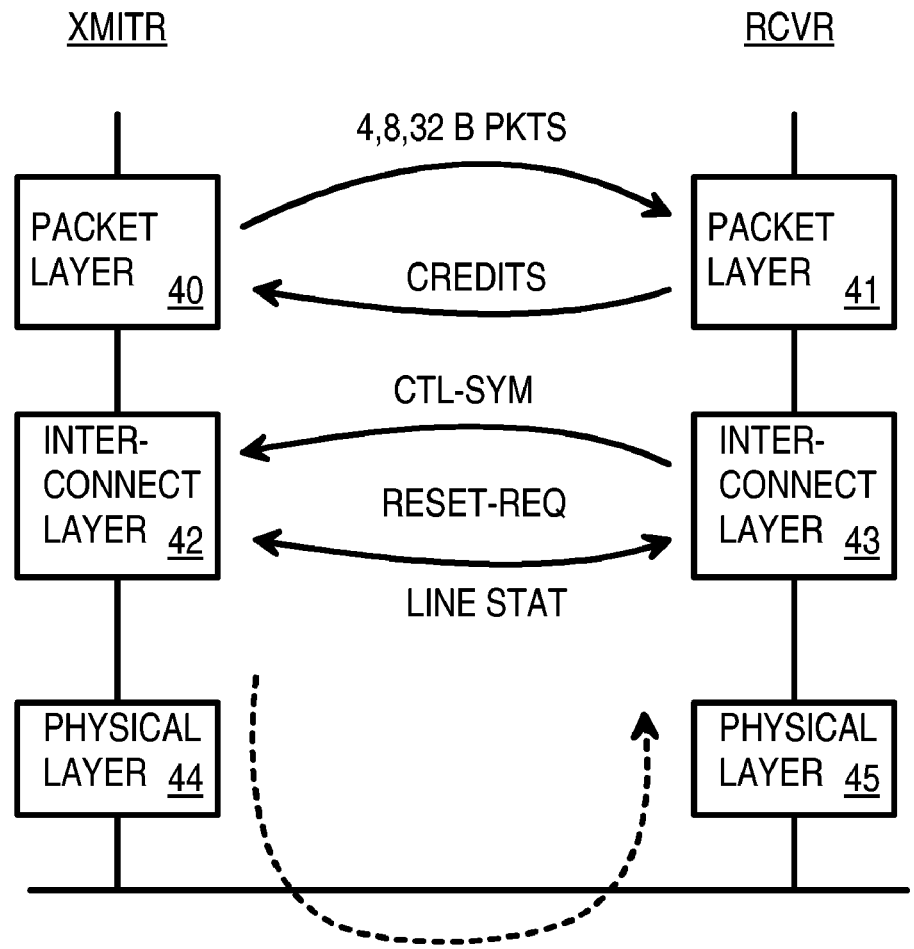
FIG. 4 is a protocol-layer diagram of a variable-packet-size communications link that uses special symbols for error recovery.

FIG. 4 is a protocol-layer diagram of a variable-packet-size communications link that uses special symbols for error recovery. A data stream is physically transmitted over a media that connects a transmitter and a receiver. Physical layers 44, 45 contain line drivers and receivers and perform low-level electrical checks for errors such as broken lines and shorts.

Packets having sizes of 4, 8, or 32 bytes are formed by packet layer 40 of the transmitter, and sent down to interconnect layer 42 and then to physical layer 44 for actual transmission of serial bits to the receiver's physical layer 45. As packets are received by receiver's packet layer 41, flow credits are returned over the reverse link to the transmitter's packet layer 40, through the lower layers. Depletion of flow credits by the transmitter causes transmitter packet layer 40 to pause transmission of additional packet until more flow credits are received from the receiver.

Interconnect layer 43 on the receiver exchanges line status information with interconnect layer 42 on the transmitter. Packet layer 41 on the transmitter extracts data from packets and performs error checking, such as by generating checksums from the received data and comparing the generated checksums to the checksums transmitted with the packets.

When the receiver detects an error, a special control symbol is sent from the receiver's interconnect layer 43 to the transmitter's interconnect layer 42 via physical layers 45, 44. This special control symbol is an invalid symbol for normal packets and never occurs within a packet. When the bit-sequence of the special symbol is detected on the transmitter's reverse link by interconnect layer 42, normal packet transmission is halted and a reset sequence is initiated. A reset request may be sent from receiver to transmitter after the special symbol is sent. This reset request may be a command for interconnect layers 42, 43, or may be a higher-level command for packet layers 40, 41, or may include commands to reset both layers.

The receiver's packet layer 40 then re-transmits packets in its buffer, starting from a re-try or de-allocation pointer that is sent from the receiver back to the transmitter. Re-transmission of these packets allows for correction of any errors that occurred. The reset and re-transmit sequences may have to be repeated several times when errors are recurring, such as during line interference or other noise.

Figure 5:
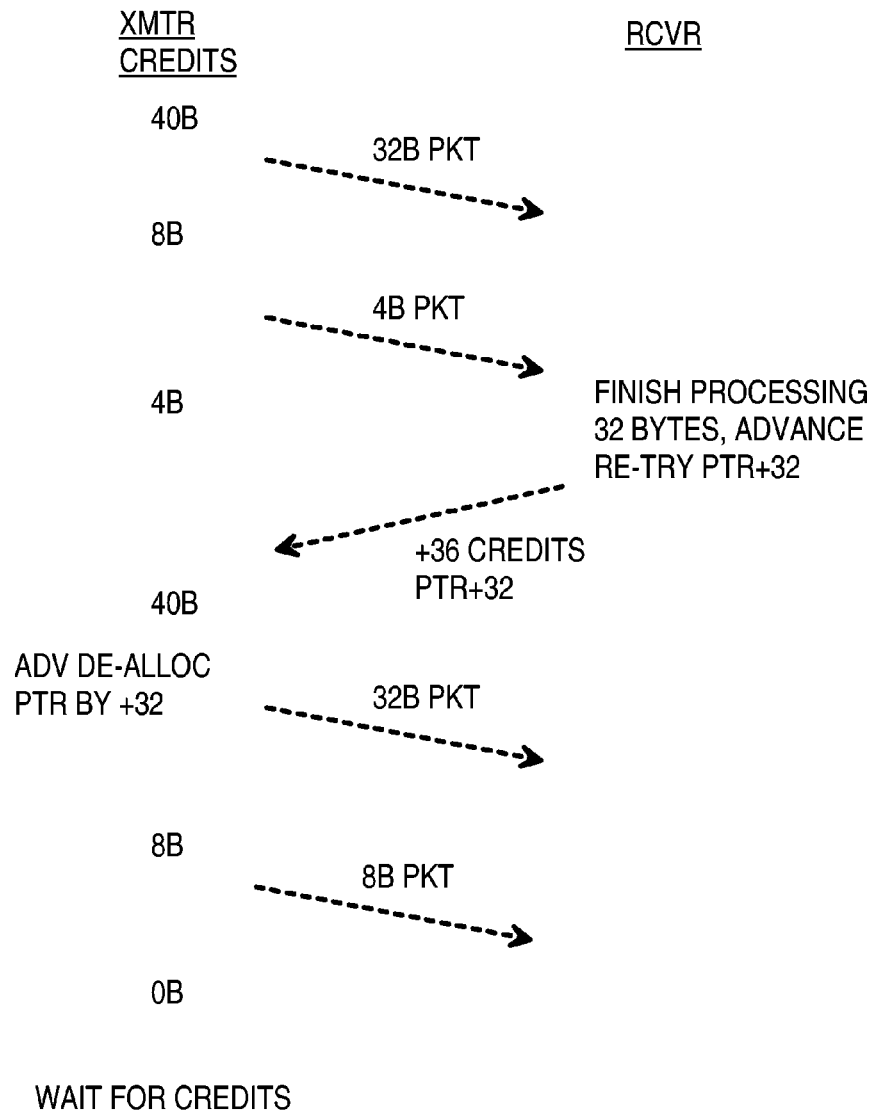
FIG. 5 illustrates exchange of packets and flow credits.

FIG. 5 illustrates exchange of packets and flow credits. The transmitter initially has 40 bytes of flow credits available and transmits a 32-byte packet to the receiver, reducing its flow credits by 32, leaving 8 bytes of flow credits.

Since the transmitter now has only 8 bytes of flow credit, it cannot send another larger, more efficient 32-byte packet. Instead, it can send only and 8 or 4 byte packet. A 4-byte packet is sent, reducing the remaining flow credits to 4.

After some latency due to the lower layers, the receiver's packet layer stores the 32-byte packet and the 4-byte packet and returns 36 bytes of flow credit to the transmitter. The transmitter increases its flow credits to 40 (4+36).

The receiver has also finished checking the 32-byte packet for errors, such as by comparing checksums, but has not yet checked the 4-byte packet. The 4-byte packet, although received and stored in the receiver's buffer, may contain errors and may still need to be retransmitted. Thus the de-allocation pointer can be advanced by 32 bytes for the 32-byte packet that is error-free, but not an additional 4 bytes for the received by not yet error-checked 4-byte packet. A message to advance the de-allocation pointer by 32 is also sent to the transmitter.

The transmitter now has 40 bytes of flow credits, and sends out another large 32-byte packet, reducing its flow credits to 8. An 8-byte packet is then transmitted, leaving the transmitter with zero flow credits. The transmitter must now stop transmitting further packets and wait for the receiver to send additional flow credits on the reverse link.

Figure 6:
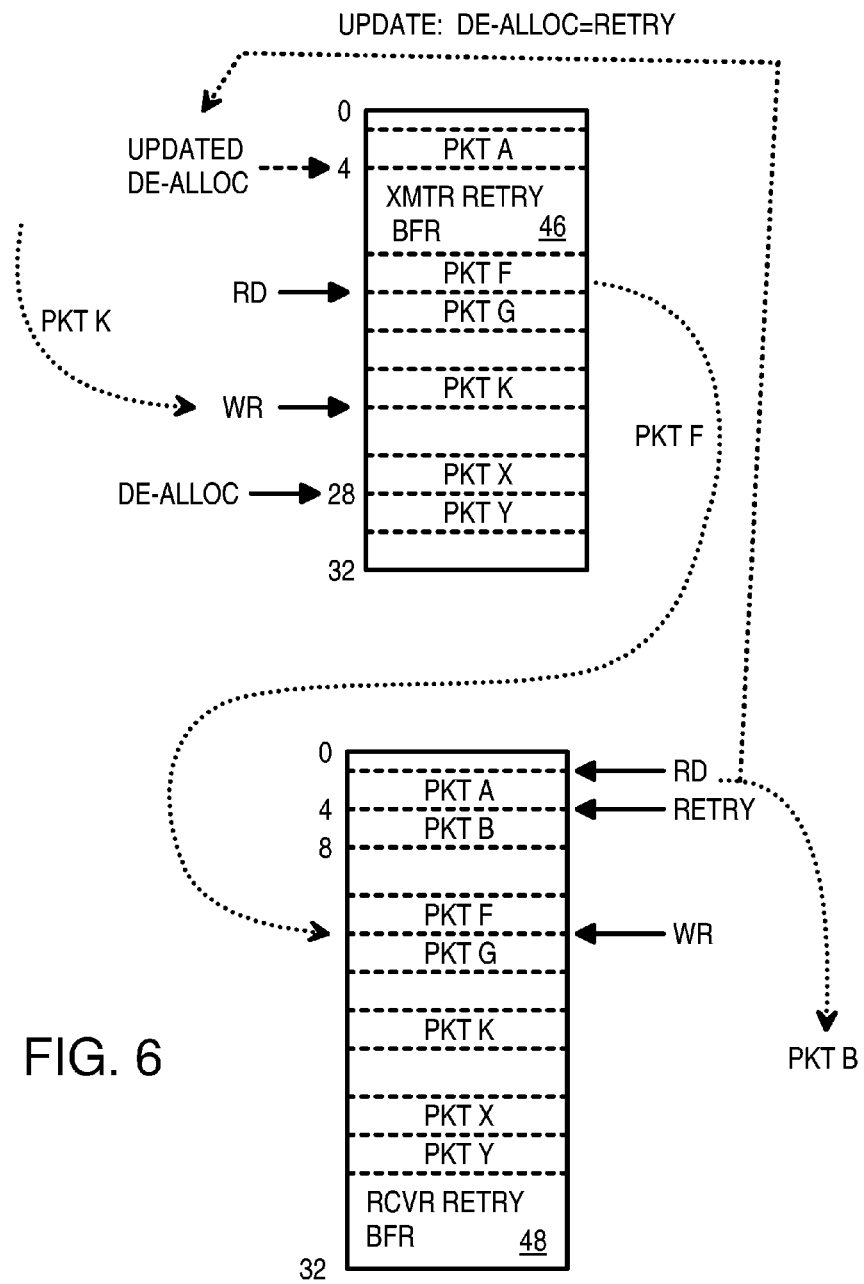
FIG. 6 highlights synchronizing of re-try and de-allocation pointers between transmitter and receiver.

FIG. 6 highlights synchronizing of re-try and de-allocation pointers between transmitter and receiver. A transmitter has a first-in-first-out (FIFO) buffer that stores packets that are ready to be transmitted to a receiver, transmit re-try buffer 46. The receiver also has a FIFO buffer that stores packets that have been received but not yet error-checked, receive re-try buffer 48. These buffers 46, 48 are shown as simple FIFO or circular buffers for illustration of pointer synchronization, but these buffers could be more complex.

Packets from a first system serviced by the transmitter are written into transmit re-try buffer 46, such as packet K that is written at the location pointed to by the write pointer WR. These packets are later read from transmit re-try buffer 46 and sent to lower protocol layers for transmission over the physical medium. Packet F is being read from transmit re-try buffer 46 at a location pointed to by read pointer RD. Packet F is sent over the physical medium to the receiver and re-assembled by the receiver.

The received packet F is written to receive re-try buffer 48 at the location pointed to by the receiver's write pointer WR. These packets are checked for errors, such as by having their CRC checksums re-generated and compared to received checksums, and then read from receive re-try buffer 48 and sent on to a second system that is serviced by the receiver.

For example, an earlier packet A is sent to an error-checking stage before being written into receive re-try buffer 48. Packet A is read from the location indicated by the read pointer RD of receive re-try buffer 48.

When an error occurs, the read pointers of transmit re-try buffer 46 must back up to the location of the packet with the error so that packet can be re-transmitted. Packets that have already been read out from transmit re-try buffer 46 and transmitted may later have to be re-transmitted, so these packets cannot yet be over-written by new packets as can occur in a normal FIFO buffer. A re-try or de-allocation pointer is used to track packets that have finished error checking in the receiver can now be over-written in transmit re-try buffer 46.

An older packet A that was already read from receive re-try buffer 48 has now finished error checking and had no detected errors. Packet A is sent to the system as data and is completely finished with processing by the receiver. The re-try (de-allocation) pointer is moved to the end of packet A in receive re-try buffer 48 to indicate that packet A will not need to be re-transmitted from the receiver. Packet B is the oldest packet that might have to be re-transmitted.

The location of the de-allocation pointer, which is at the end of packet A, location or address 4 in receive re-try buffer 48, is sent over the reverse link to the transmitter. The de-allocation pointer in transmit re-try buffer 46 is updated to this value (4). The de-allocation pointer had been between at location 28 packets X and Y in transmit re-try buffer 46, so the pointer wraps around to location 4. Previously the write pointer WR was prevented from advancing past location 28 by the de-allocation pointer, but with the de-allocation pointer advanced to location 4, the write pointer can now wrap around to location 4.

The transmitter can now over-write the old packets X, Y, and A in transmit re-try buffer 46 with a new packet. Any other packets between the write pointer and the end of the buffer, and from the beginning of the buffer to the de-allocation pointer at location 4 can now be over-written with new packets.

Thus the re-try pointer in receive re-try buffer 48 is advanced as packets finish error checking in the receiver. These movements of the re-try pointer in the receiver's buffer are sent over the reverse link to the transmitter. The transmitter then advances its de-allocation pointer to match the receiver's re-try pointer. Thus re-try and de-allocation pointers are synchronized between receiver and transmitter.

There may be a latency or delay in transmitting adjustments of the de-allocation pointer from the receiver to the transmitter. Thus at any given moment, the transmitter's de-allocation pointer is likely to be somewhat behind the receiver's de-allocation pointer due to these transmission delays.

Figure 7:
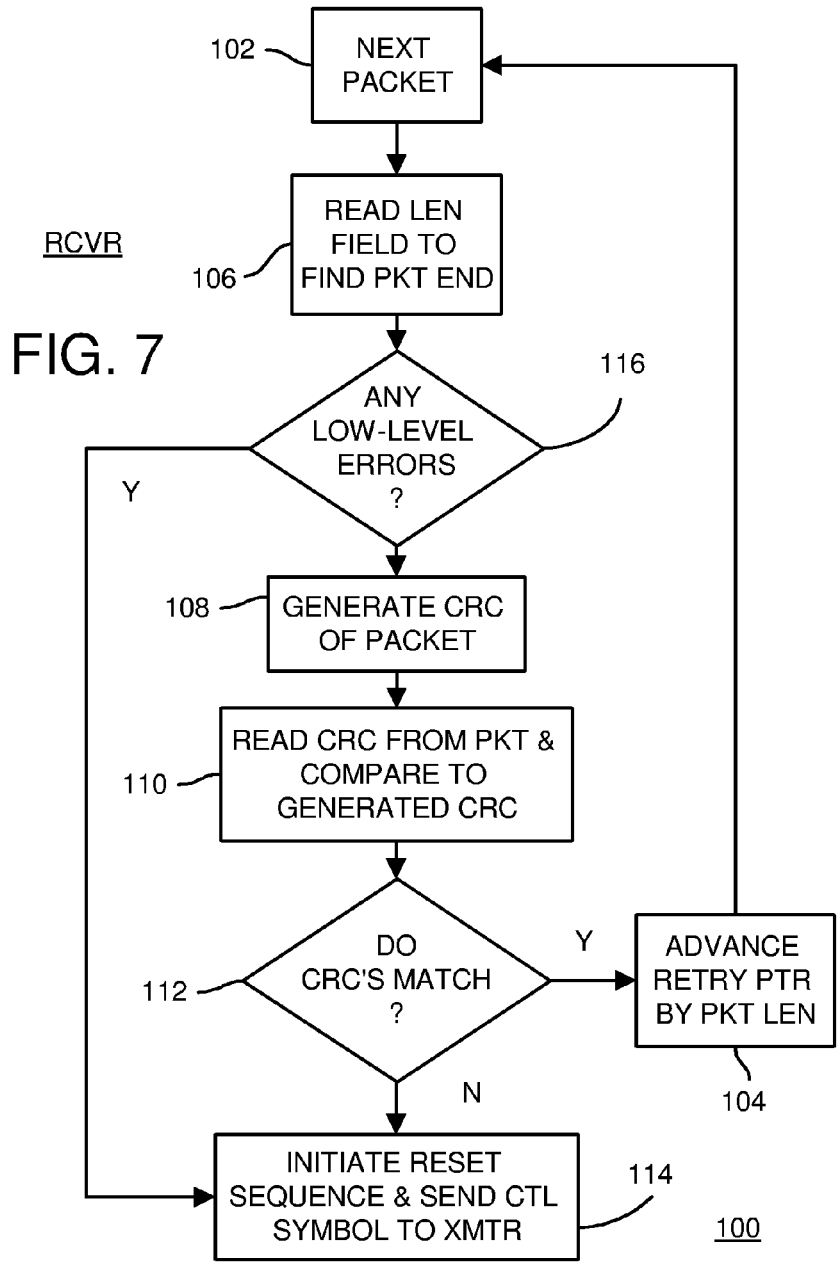
FIG. 7 is a flowchart of the receiver processing packets.

FIG. 7 is a flowchart of the receiver processing packets. In packet processing routine 100, for each packet, step 102, the length field is read, step 106. The length field indicates the length of the packet. This length can include the entire packet, or just the data payload portion of the packet when the length and CRC fields have a fixed size. The length field can contain a numeric value of bytes, or a selector from among possible sizes, such as two bits that select from among data lengths of 4, 8, 16, or 32 bytes. The end of the packet can be determined from this length field, step 106, allowing the start of the next packet to be located.

When a low-level error is detected, step 116, error processing occurs to re-transmit the bad packet. The control symbol is sent over the reverse link to the transmitter and a reset sequence initiated, step 114, such as the reset sequence of FIG. 8. The low-level error could be a link error, a clock error, or a formatting error such as an illegal value of the length or an illegal symbol in the data payload.

A cyclical-redundancy-check (CRC) checksum for the packet is generated, step 108. This generated checksum can be generated from the entire packet, or from just a portion of the packet such as the data payload, or the length field and the data payload.

The checksum transmitted with the packet is read and compared to the generated checksum, step 110. When the checksums mis-match, an error is detected, step 112. Otherwise, matching checksums allow the packet to be sent to downstream logic in the receiver's system, and the re-try pointer is advanced by the packet length, step 104, and the next packet processed, step 102.

When the checksums do not match, step 112, an error is detected. The control symbol is sent over the reverse link to the transmitter and a reset sequence initiated, step 114, such as the reset sequence of FIG. 8.

Figure 8:
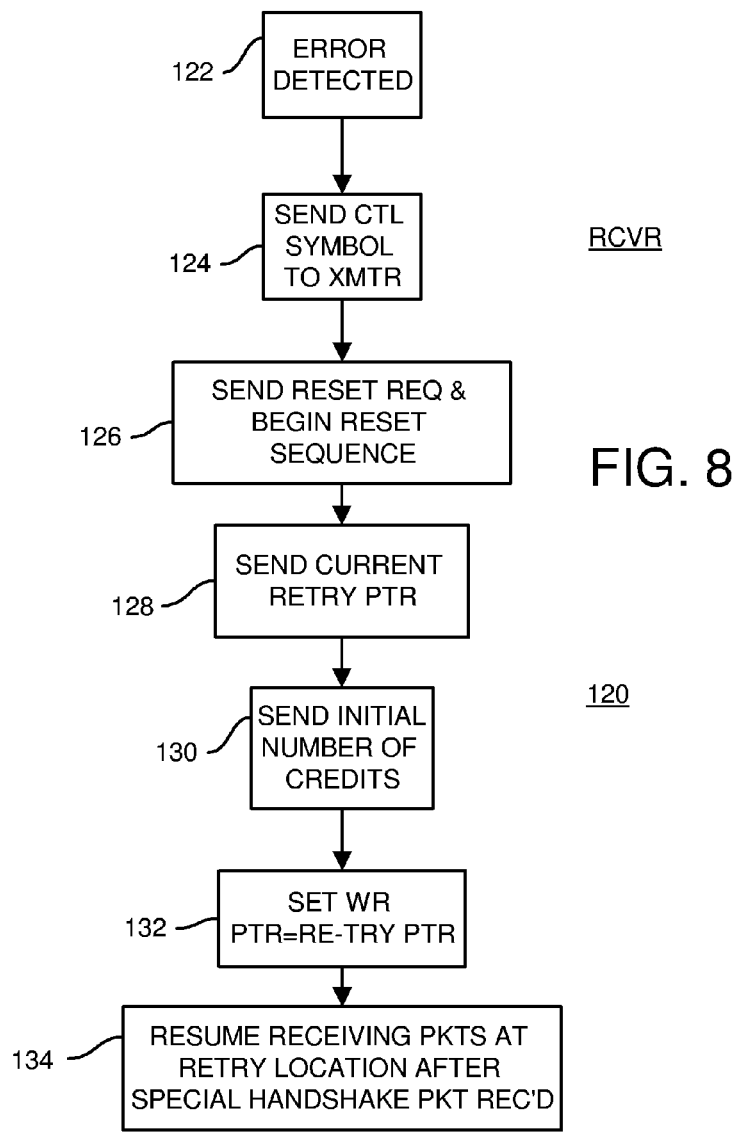
FIG. 8 is a flowchart of error processing on the receiver.

FIG. 8 is a flowchart of error processing on the receiver. Error routine 120 is called in response to an error detected by packet processing on the receiver, such as a checksum mismatch or a low-level formatting or electrical error. When an error is detected, step 122, a control symbol is sent over the reverse link to the transmitter, step 124. This control symbol is an illegal symbol or sequence of bits for the data payload, length, and CRC fields of a packet and thus cannot occur in a normal packet. The control symbol can be a 10-bit symbol such as /T/ repeated over all 4 lanes simultaneously. The possible 10-bit symbols can be defined by a standard, such as IEEE 802.

A request or command to begin a link-reset is sent over the reverse link, step 126. This reset request causes the transmitter to halt transmission of packets and wait for the de-allocation pointer from the receiver. There may be several packets exchanged between receiver and transmitter as part of the reset sequence, such as request and acknowledgement packets.

The receiver then sends its re-try pointer over the reverse link to the transmitter, step 128. The transmitter adjusts its read pointer to match the de-allocation pointer from the receiver to point to the packet to begin re-transmission. A number of flow credits that the transmitter should initialized to can also be sent, step 130. Alternately, the flow credits can automatically be reset to a default value in response to the reset request.

The receiver must get ready to receive for a second time the packets that are going to be re-transmitted by the transmitter. The write pointer in receive re-try buffer 48 is moved back to the location of the re-try (de-allocation) pointer, step 132. The packets between the old write pointer and the re-try pointer may have errors and will be over-written by the newly re-transmitted packets. The receiver waits to receive a special handshake packet from the transmitter that indicates that the transmitter is ready to begin retransmission. The receiver can then begin receiving packets from the transmitter, which are re-transmitted beginning from the location of the re-try pointer, step 134. As these packets are written into receive re-try buffer 48, the write pointer is advanced. If another error occurs during error routine 120, error routine 120 may be re-started at step 122.

Figure 9:
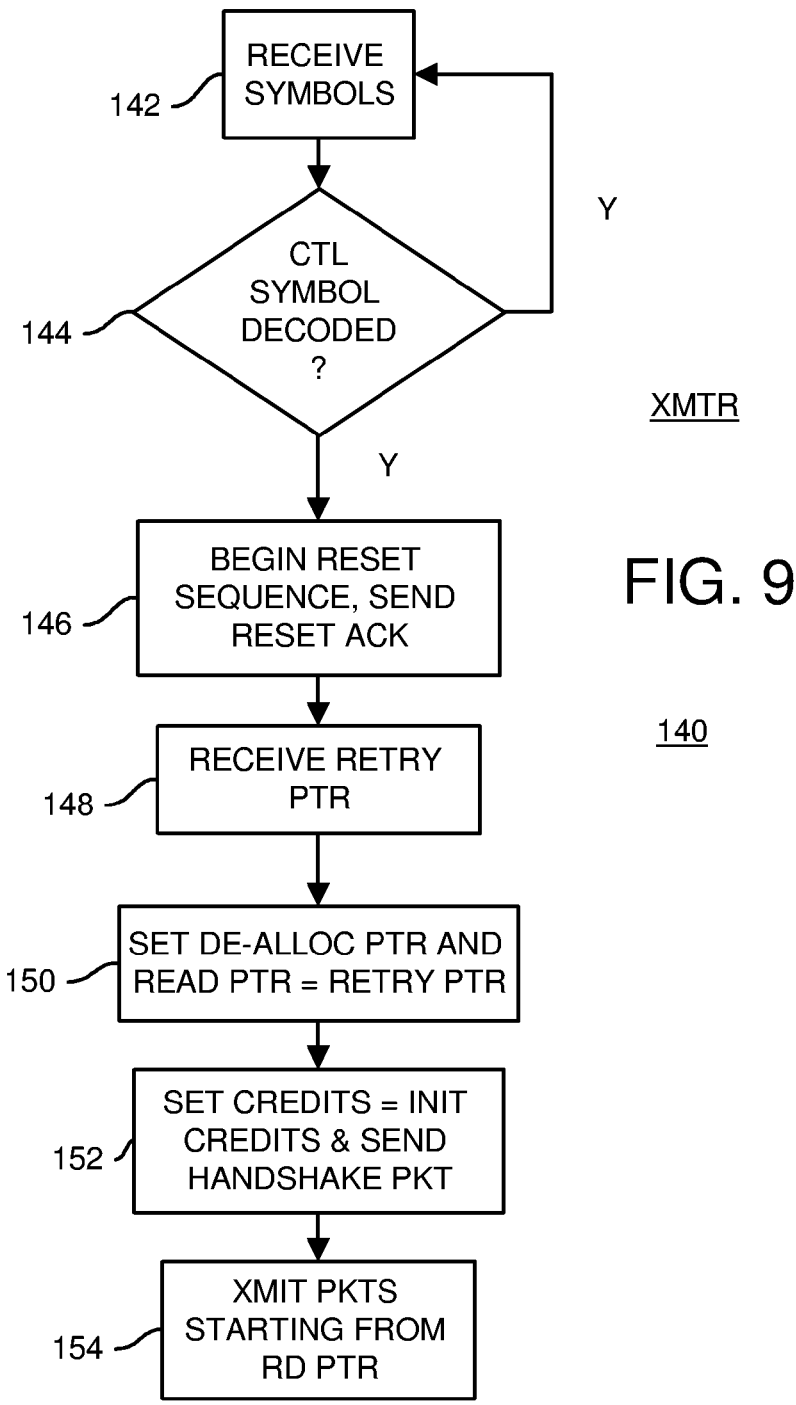
FIG. 9 is a flowchart of error processing on the transmitter.

FIG. 9 is a flowchart of error processing on the transmitter. Error routine 140 is activated on the transmitter when the control symbol is decoded in the reverse link, step 144. Otherwise, the incoming bitstream on the reverse link is scanned for symbols, step 142, until a match is found.

Detection of the control symbol, step 144, causes the transmitter to halt transmission of packets and begin a reset sequence, step 146. An acknowledgement to the reset request may be sent over the forward link to the receiver.

The re-try pointer from the receiver is received on the reverse link, step 148, and becomes the new de-allocation pointer for transmit re-try buffer 46. Both the old de-allocation pointer and the read pointer in transmit re-try buffer 46 are set to the value of the re-try pointer from the receiver, step 150.

The number of flow credits is re-initialized to the number of flow credits sent from the receiver during the reset sequence, step 152, or can be set to a pre-determined initial value. A special handshake packet is sent from the transmitter to the receiver to indicate that retransmission is ready to begin. The special handshake packet can include a number of flow credits being relinquished by the transmitter. Then the initial number of flow credits may not have to be sent from the receiver to the transmitter. The reset sequence ends and the transmitter then begins transmitting packets from the updated de-allocation pointer location, advancing the read pointer as packets are re-transmitted.

Figure 10:
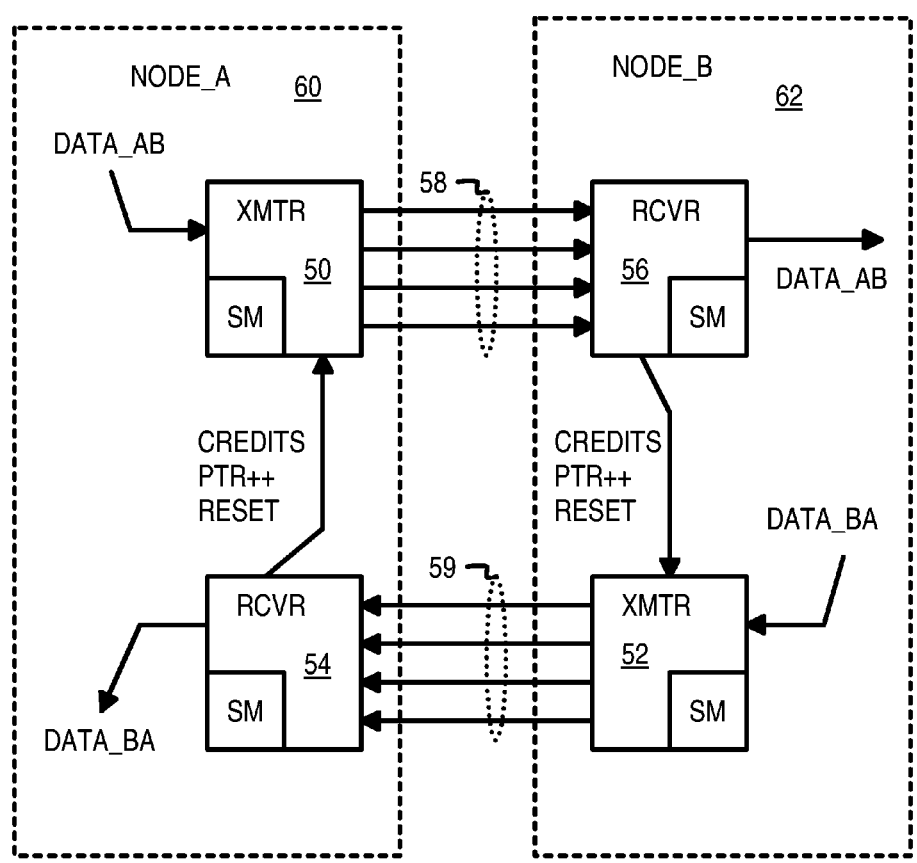
FIG. 10 is a diagram of bi-directional links between two systems.

FIG. 10 is a diagram of bi-directional links between two systems. Data is exchanged between first system 60, node A, and second system 62, node B, in both directions. First transmitter 50 in first system 60 sends forward data AB to second receiver 56 in second system 62 over first links 58. While a single serial link could be used between first transmitter 50 and second receiver 56, multiple serial links may be used to increase bandwidth. Data may be sent over first links 58 aligned as 4-bit words or separately on each serial link. This can be considered the forward link.

Second transmitter 52 in second system 62 sends reverse data AB to first receiver 54 in first system 60 over second links 59. Multiple serial links are used to increase bandwidth between second transmitter 52 and first receiver 54. This can be considered the reverse link.

Flow credits, de-allocation pointer adjustments, and control symbols and reset requests from second receiver 56 are sent back to first transmitter 50 through second transmitter 52. Second transmitter 52 opportunistically sends these credits, pointer adjustments, and reset symbols over second links 59 to first receiver 54 when bandwidth is available.

First receiver 54 forwards the credits, pointer adjustments, and reset symbols to first transmitter 50, which then responds to second receiver 56. Likewise, credits, pointer adjustments, and reset symbols from first receiver 54 are sent to second transmitter 52 through first transmitter 50 and second receiver 56 over first links 58 as bandwidth allows.

Figure 11:
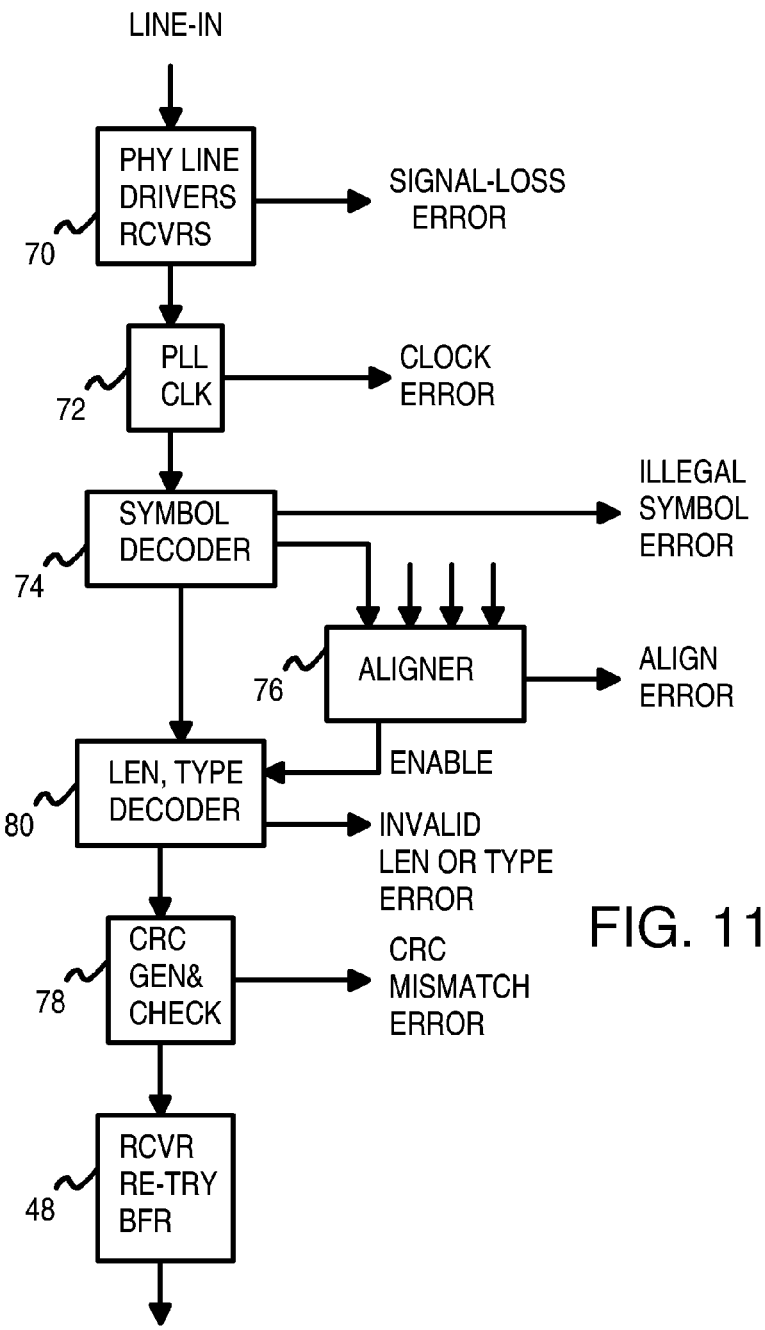
FIG. 11 is a block diagram highlighting detection of various kinds of errors in the receiver.

FIG. 11 is a block diagram highlighting detection of various kinds of errors in the receiver. The physical media is attached to physical line interface 70, which has line receivers and/or line drivers. When the media is physically cut, such as when a cable is accidentally removed, a signal-loss error is detected. The signal-loss error could also occur when a short or other electrical failure occurs, or the loss of light in a fiber-optic media.

Phase-locked loop (PLL) clock generator 72 extracts a clock from the incoming signal from physical line interface 70. When there are few or no transitions of the signal from physical line interface 70, the PLL loses lock and a clock failure error is detected.

Symbol decoder 74 compares bits in the incoming bitstream to known symbols and generates an illegal symbol error when an undefined or illegally symbol of bits occur. Symbols may be serial sequences of serial bits on a single serial link, or may be from parallel data sent over several serial links in parallel. Aligner 76 signal an alignment error when the parallel serial links are not aligned. An alignment symbol such as /A/ can be sent over all parallel links.

Length decoder 80 decodes the length and type fields if present. Length decoder 80 signal an invalid length or type error when the length field contains an invalid length coding. When a type field is also present, length decoder 80 also signals an error when the packet type is not defined.

CRC checker 78 generates a checksum for the packet and compares the generated checksum to a received checksum from the packet. When the checksums do not match, a CRC mismatch error is detected.

Receive re-try buffer 48 can be located after CRC checker 78 and receive packets that have been checked. When there is a delay in verifying the checksum, the packets in receive re-try buffer 48 must wait for a few cycles until verification is complete before the de-allocation pointer can be advanced and the packet read to the system. Receive re-try buffer 48 could be very shallow, such as only a few bytes, to improve latency.

Alternately, receive re-try buffer 48 could be located before length decoder 80 and receive packets before they have been checked. Packets in receive re-try buffer 48 are read out to CRC checker 78, advancing the read pointer, but the packets must wait for a few cycles until verification is complete before the de-allocation pointer can be advanced and the packet read to the system.

Detecting low-level and formatting errors allows for detecting errors that can cause entire packets to be skipped. These packet-dropping failures might not be detected by merely comparing checksums. Thus detecting low-level errors improves the robustness of error detection and the communications system.

ALTERNATE EMBODIMENTS

Several other embodiments are contemplated by the inventor. For example various logic blocks and functional units may be used, such as state machines to control transmitter and receiver functions on various levels. Software or firmware may be used for higher protocol levels while hardware is used for lower levels.

Pointers can advance by moving in the normal direction, which could be to smaller addresses rather than to larger addresses when inverse addressing or pointer decrementing is used. Also, with a circular buffer such as a FIFO, pointers advance past the end of the buffer by wrapping around to the beginning of the buffer, which causes the pointer address to be reduced, rather than increased. Thus the term advanced is used in a broader sense than simply increasing a numeric value. The invention may be implemented on different signaling layers such as XAUI, Ethernet, Gigabit Ethernet, iSCSI, custom logical protocols based on low-voltage differential signaling (LVDS) or other electrical interfaces, or other signaling protocols that don't have hardware error recovery, or on parallel rather than serial links.

Flow credits have been described as being byte credits, but each credit could be for a 32-byte unit, 8-byte unit, or some number of bits. Pointers may be byte addresses, or be multi-byte word addresses, or refer to packets of varying size, such as a virtual packet sequence number. Receive re-try buffer 48 may not be a separate physical FIFO memory but could be several buffer areas or a larger multi-purpose memory, a linked list, or some other storage arrangement. Receive re-try buffer 48 could be two separate buffers at different stages in a pipeline. Receive re-try buffer 48 could be a small one-packet buffer, while transmit re-try buffer 46 is a larger buffer. More significant bits for the receiver's de-allocation pointer could be generated by a counter and stored to emulate pointers the larger transmit re-try buffer. Thus transmit re-try buffer 46 and receive re-try buffer 48 do not have to be the same size to exchange pointers.

Additional buffers, registers, latches, and other storage may be inserted into the receive or transmit pipelines at a variety of locations. Likewise transmit re-try buffer 46 could have a variety of implementations.

Error checking could occur before packets are written into receive re-try buffer 48, or after packets are written into receive re-try buffer 48, or even after packets are read out from receive re-try buffer 48 in various alternate embodiments. When error checking occurs after packets are read from receive re-try buffer 48, then the de-allocation pointer trails the read pointer. When error checking occurs after packets are written into but before read from receive re-try buffer 48, then the de-allocation pointer leads the read pointer, but trails the write pointer.

The packets may contain additional fields, such as a packet-type field. These additional fields can be considered part of the data payload or part of the length field. Higher-level protocols may generate headers that are embedded into the data payloads of lower-level protocols. The checksum may use a cyclical-redundancy-check (CRC) algorithm or some other algorithm such as simple parity or error-correcting code such as Reed-Solomon.

Additional serial links could be used in parallel, such as 4, 8, 16, or more serial links or lanes. The parallel links could send data aligned as multi-bit-wide words, or operate separately of each other. The control symbols and credits could be sent as parallel data over all links, or over just one of the links.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A variable-length packet transmitter comprising:
   a transmit re-try buffer for storing packet data received from a first host system serviced by the variable-length packet transmitter;
   a write pointer for the transmit re-try buffer, the write pointer indicting a writing location within the transmit re-try buffer to write new packet data received from the first host system, the writing location being advanced as additional packet data is received from the first host system;
   a read pointer for the transmit re-try buffer, the read pointer indicting a reading location within the transmit re-try buffer to read packet data from for transmission to a remote receiver;
   a serial link to the remote receiver for sending packet data read from the transmit re-try buffer to the remote receiver;
   a de-allocation pointer for the transmit re-try buffer, the de-allocation pointer indicting an over-writing location within the transmit re-try buffer wherein the write pointer is prevented from advancing past the de-allocation pointer; and
   a reverse channel from the remote receiver for receiving pointer updates from the remote receiver, the pointer updates causing the de-allocation pointer to advance to provide additional space within the transmit re-try buffer for writing packet data from the first host system,
   whereby pointer updates from the remote receiver update the de-allocation pointer and the over-writing location in the transmit re-try buffer.

2. The variable-length packet transmitter of claim 1 wherein the pointer updates from the remote receiver are generated when packets sent over the serial link have completed error checking by the remote receiver and no longer have a possibility of requiring re-transmission from the transmit re-try buffer,
   whereby updates to the de-allocation pointer indicate completion of packet error checking by the remote receiver.

3. The variable-length packet transmitter of claim 2 further comprising:
   a symbol decoder, coupled to the reverse channel, for detecting a control symbol sent from the remote receiver over the reverse channel;
   wherein the control symbol is an illegal symbol that is not contained in packet data sent over the serial link during normal processing when no errors occur.

4. The variable-length packet transmitter of claim 3 further comprising:
   a reset processor, activated by the symbol decoder, for halting transmission of packet data from the transmit re-try buffer over the serial link in response to reception of the control symbol over the reverse channel;
   wherein the read pointer is adjusted by the reset processor to match the de-allocation pointer when the control symbol is detected in the reverse channel;
   wherein re-transmission of packet data from the transmit re-try buffer begins at the over-writing location indicated by the de-allocation pointer in response to the control symbol.

5. The variable-length packet transmitter of claim 4 wherein a pointer update is sent over the reverse channel after the control symbol to update the de-allocation pointer for re-transmission.

6. The variable-length packet transmitter of claim 1 wherein each packet sent over the serial link comprises:
   a length field that indicates a length of the packet, wherein the length field specifies a length from among a group of at least three possible lengths for packets;
   a data payload having a variable size directly or indirectly determined by the length field; and
   a checksum for verifying the data payload to detect transmission errors at the remote receiver;

wherein a length field of a following packet directly follows a checksum or a prior packet without a packet-start field to mark a beginning of the following packet.

7. The variable-length packet transmitter of claim 6 wherein the transmit re-try buffer is a circular buffer with pointers wrapping around at an end of the transmit re-try buffer to a beginning of the transmit re-try buffer.

8. The variable-length packet transmitter of claim 7 wherein the transmit re-try buffer is a first-in-first-out (FIFO) buffer.

9. A packet communications system comprising:
a first host generating first data for transmission;
a second host generating second data and processing the first data received from the first host;
a forward link between the first host and the second host for sending the first data from the first host to the second host;
a reverse link between the second host and the first host for sending the second data from the second host to the first host;
a first transmitter on the first host and connected to drive the forward link;
a first receiver on the first host connected to receive from the reverse link;
a second transmitter on the second host and connected to drive the reverse link;
a second receiver on the second host connected to receive from the forward link;
a transmit re-try buffer, coupled between the first host and the first transmitter, for writing and storing first data received from the first host at a buffer location indicated by a write pointer and for reading first data packets from a buffer location indicated by a read pointer for transmission over the forward link;
a receive re-try buffer, coupled between the second receiver and the second host, for writing and storing first data packets received from the forward link at a buffer location indicated by a write pointer and for reading first data packets from a buffer location indicated by a read pointer for processing by the second host;
wherein a packet in the first data packets begins with a length field that indicates a variable length of the packet, the packet further comprising a data payload of variable length determined by the length field and a checksum;
a re-try pointer for the receive re-try buffer that indicates a buffer location of a boundary between packets that may contain errors and packets that have completed error processing without errors;
an error detector for the second receiver that signals a reception error for a packet sent over the forward link;
a symbol generator that generates a control symbol that is never found in the first data packets, wherein the control symbol is sent by the second transmitter over the reverse link to the first receiver to halt the first transmitter when the error detector detects the reception error;
wherein the re-try pointer for the receive re-try buffer is transmitted over the reverse link to the first receiver and forwarded to the transmit re-try buffer to reset the write pointer of the transmit re-try buffer in response to the re-try pointer when the reception error in the forward link is signaled.

10. The packet communications system of claim 9 further comprising:

a de-allocation pointer for the transmit re-try buffer, the write pointer being prevented from advancing past the de-allocation pointer to prevent over-writing first data packets that have been transmitted over the forward link but not yet error checked by the second receiver;
wherein the de-allocation pointer is advanced by messages sent over the reverse link as first data packets are error checked by the second receiver.

11. The packet communications system of claim 9 wherein the error detector generates a generated checksum for each first packet and compares the generated checksum to the checksum in the packet and signals the reception error when checksums mis-match.

12. The packet communications system of claim 11 wherein the second receiver further comprises:
a physical line interface that connects to physical media for the forward link, the physical line interface generating the reception error when loss of signal is detected on the physical media;
a clock extractor, coupled to the physical line interface, for extracting a clock from a received signal, the clock extractor generating the reception error when the clock is lost;
a symbol decoder, coupled to the clock extractor, for detecting illegal bit sequences and generating the reception error in response to illegal bit sequences,
whereby the reception error is signaled when low-level signal, clock, illegal symbol, or checksum mismatch errors are detected.

13. The packet communications system of claim 9 further comprising:
a flow credit register for storing a number of flow credits for the first transmitter;
wherein flow credits are sent over the reverse link and forwarded to the first transmitter in response to the second receiver receiving first data packets;
wherein the number of flow credits in the flow credit register are reduced by transmission of first data packets by the first transmitter and replenished by flow credits sent over the reverse link;
wherein the first transmitter pauses transmission when the number of flow credits in the flow credit register falls below a limiting value,
whereby transmission by the first transmitter is limited by flow credits from the second receiver.

14. The packet communications system of claim 9 wherein the forward link comprises a plurality of serial links in parallel between the first transmitter and the second receiver.

15. A method for communicating packets comprising:
receiving serial data over a forward link from a transmitter and writing the serial data into a receive re-try buffer at a location indicated by a write pointer that advances with data written;
for each packet in the receive re-try buffer:
reading a length field at a starting location of a packet and decoding the length field to determine a length of the packet, wherein the length of packets varies among a plurality of allowed packet lengths encoded by the length field;
determining from the length field the starting location of a next packet that follows the packet;
reading a data payload for the packet and generating a generated checksum from the data payload;

reading a transmitted checksum for the packet and comparing the transmitted checksum to the generated checksum and signaling an error when checksums mis-match;

sending the data payload of the packet to a receiving host system and advancing a re-try pointer by the length of the packet when no error is signaled;

sending a control symbol over a reverse link to the transmitter when the error is signaled, the control symbol being an illegal sequence of bits that is not present in the data payload or the length field or the transmitted checksum for normal packets;

sending a pointer-update message over the reverse link to the transmitter, the pointer-update message containing the re-try pointer or an adjustment for the re-try pointer;

the transmitter receiving the control symbol over the reverse link and halting packet transmission over the forward link in response to the error;

the transmitter resetting a read pointer in a transmit re-try buffer in response to the pointer-update message so that the read pointer in the transmit re-try buffer points to a same packet as the re-try pointer in the receive re-try buffer; and the transmitter re-transmitting packets from the transmit re-try buffer starting at the same packet pointed to by the re-try pointer and the read pointer of the transmit re-try buffer in response to the error, whereby packets are re-transmitted from a location of the re-try pointer sent from a receiver to the transmitter when the error is signaled.

16. The method of claim 15 further comprising:

the receiver sending re-try pointer messages over the reverse link to the transmitter when no error is signaled, the transmitter adjusting a de-allocation pointer in the transmit re-try buffer in response to the re-try pointer messages;

wherein the transmitter retains packets past the de-allocation pointer but discards or over-writes packets before the de-allocation pointer in the transmit re-try buffer.

17. The method of claim 15 further comprising:

the receiver sending flow credit messages over the reverse link to the transmitter, the flow credit message increasing flow credits for the transmitter in response to packets received over the forward link;

wherein the transmitter reduces flow credits in response to packets transmitted over the forward link;

wherein the transmitter pauses packet transmission over the forward link when flow credits are depleted, whereby transmission over the forward link is regulated by the flow credits.

18. The method of claim 15 further comprising:

signaling the error and sending the control symbol over the reverse link to the transmitter when a low-level error is detected;

whereby the error is signaled when checksums mis-match or low-level errors are detected.

19. The method of claim 18 further comprising:

signaling the error when a physical line interface detects a loss of signal or when a clock extractor detects a loss of clock, or when a symbol decoder decodes an illegal symbol, whereby the error is signaled when checksums mis-match or low-level errors are detected.

* * * * *